US 7,664,947 B2

(12) United States Patent
Fang

(10) Patent No.: US 7,664,947 B2
(45) Date of Patent: Feb. 16, 2010

(54) SYSTEMS AND METHODS FOR AUTOMATED EXCHANGE OF ELECTRONIC MAIL ENCRYPTION CERTIFICATES

(75) Inventor: Wen Fang, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 807 days.

(21) Appl. No.: 11/248,500

(22) Filed: Oct. 12, 2005

(65) Prior Publication Data

US 2007/0083749 A1   Apr. 12, 2007

(51) Int. Cl.
H04L 29/06 (2006.01)
H04L 9/32 (2006.01)
G06F 15/16 (2006.01)
G06F 17/30 (2006.01)

(52) U.S. Cl. .................. 713/152; 713/153; 713/154; 713/175; 726/3; 726/4; 726/11; 380/259; 709/232

(58) Field of Classification Search .................. None
See application file for complete search history.

(56) References Cited

U.S. PATENT DOCUMENTS

| 4,870,683 | A | 9/1989 | Atalla |
| 4,885,779 | A | 12/1989 | Atalla et al. |
| 4,918,728 | A | 4/1990 | Matyas et al. |
| 4,949,381 | A | 8/1990 | Pastor |
| 5,142,577 | A | 8/1992 | Pastor |
| 5,586,036 | A | 12/1996 | Pintsov |
| 5,604,803 | A | 2/1997 | Aziz |
| 5,708,780 | A | 1/1998 | Levergood et al. |
| 5,732,137 | A | 3/1998 | Aziz |
| 6,005,945 | A | 12/1999 | Whitehouse |
| 6,041,704 | A | 3/2000 | Pauschinger |
| 6,073,125 | A | 6/2000 | Cordery et al. |
| 6,173,273 | B1 | 1/2001 | Herbert |
| 6,212,281 | B1 | 4/2001 | Vanstone |
| 6,289,105 | B1 | 9/2001 | Murota |
| 6,560,705 | B1 * | 5/2003 | Perlman et al. ............. 713/154 |
| 6,687,822 | B1 | 2/2004 | Jakobsson |
| 6,728,378 | B2 | 4/2004 | Garib |
| 6,732,101 | B1 | 5/2004 | Cook |
| 6,745,231 | B1 | 6/2004 | Megiddo |
| 6,760,752 | B1 | 7/2004 | Liu et al. |
| 6,775,711 | B1 | 8/2004 | Akimoto |
| 6,889,328 | B1 * | 5/2005 | Sanchez Herrero et al. .... 726/3 |
| 7,092,728 | B1 * | 8/2006 | Gress et al. ................. 455/466 |
| 7,162,738 | B2 * | 1/2007 | Dickinson et al. ............. 726/14 |

* cited by examiner

*Primary Examiner*—Kaveh Abrishamkar

(57) ABSTRACT

Systems and methods for automated exchange of encryption certificates for transmitting and receiving encrypted email messages are disclosed. In one embodiment, a method of communicating an encrypted email message includes providing a recipient identifier, creating an unencrypted email message, automatically querying a recipient email domain for a recipient encryption key corresponding to the recipient identifier, automatically receiving the recipient encryption key from the recipient email domain, automatically encrypting the unencrypted email message using the recipient encryption key, and transmitting the encrypted email message to the recipient identifier.

18 Claims, 11 Drawing Sheets

SYSTEMS AND METHODS FOR AUTOMATED EXCHANGE OF ELECTRONIC MAIL ENCRYPTION CERTIFICATES

FIELD OF THE INVENTION

The present disclosure relates to the automated exchange of electronic mail encryption certificates, and more specifically, to the automated exchange of encryption certificates for transmitting and receiving encrypted email messages suitable for use among large numbers of users.

BACKGROUND OF THE INVENTION

The need by some businesses and organizations to exchange encrypted email among large numbers of users has grown from a nice-to-have feature to an important business requirement. For many such businesses and organizations, however, the current approach to the exchange of email encryption certificates presents a substantial impediment to the effective implementation of this requirement.

In many typical email encryption systems, in order for a sender to transmit an encrypted email message to a receiver, the encryption algorithm uses both a first (or public) key and a second (or private) key of the receiver. Thus, during formulation of the encrypted email message, the sender must have the public keys of all of the recipients of the message. Similarly, to properly de-encrypt the email message, the receiver must have the private key of his own. The public key information is typically exchanged between the sender and receiver using an encryption certificate. Prior art email encryption systems of the type described above are generally disclosed, for example, in U.S. Pat. No. 6,760,752 B1 issued to Liu and Cook, U.S. Pat. No. 6,687,822 B1 issued to Jakobsson, and U.S. Pat. No. 6,289,105 B1 issued to Murota.

Current industry standards for transmitting email messages via the Internet do not include a standard for the automated exchange of encryption keys and encryption certificates necessary for the successful transmission of encrypted email. As a result, the exchange of encryption keys among users in the past has been accomplished manually and on an ad hoc basis. Typically, the current manual process for the above-described email encryption systems involves a first user digitally signing an email to a second user with a digital signature (or encryption certificate) that includes the first user's key. The second user then saves the first user's key and is thereafter able to formulate and transmit encrypted email messages to the first user. To read the encrypted messages, the first user must then obtain the second user's key via the transmission of another digital signature from the second user to perform the de-encryption.

Although desirable results have been achieved using such prior art systems, there is room for improvement. For example, when a sender desires to send an encrypted email message to a large number of users, the manual exchanges that must occur between the sender and each recipient add inefficiency (and therefore cost) to the process. As the number of intended recipients increases (e.g. hundreds, thousands), the manual approach becomes severely impractical, and as the number further increases (e.g. tens and hundreds of thousands), the manual approach becomes virtually impossible. This problem is further compounded when the respective keys of the email users of the organization randomly and non-uniformly expire or are updated by the individual users, or as new users are added

SUMMARY OF THE INVENTION

The present invention is directed to systems and methods for automated exchange of encryption certificates for transmitting and receiving encrypted email messages. Embodiments of the present invention may enable the transmission of encrypted email messages to be performed more efficiently in comparison with prior art methods, particularly within organizations having large numbers of users.

In one embodiment, a method of communicating an encrypted email message includes providing a recipient identifier, creating an unencrypted email message, automatically querying a recipient email domain for a recipient encryption key corresponding to the recipient identifier, automatically receiving the recipient encryption key from the recipient email domain, automatically encrypting the unencrypted email message using the recipient encryption key, and transmitting the encrypted email message to the recipient identifier.

BRIEF DESCRIPTION OF THE DRAWINGS

Embodiments of the present invention are described in detail below with reference to the following drawings.

DETAILED DESCRIPTION

The present invention relates to systems and methods for automated exchange of encryption certificates for transmitting and receiving encrypted email messages. Many specific details of certain embodiments of the invention are set forth in the following description and in FIGS. 1-8 to provide a thorough understanding of such embodiments. The present invention, however, may have additional embodiments, or may be practiced without one or more of the details described below.

In general, embodiments of systems and methods in accordance with the present invention enable the automated exchange of encryption certificates, thereby allowing a sender to transmit an encrypted email message to an authorized recipient without the need for the sender to manually obtain the recipient's encryption certificate. Using embodiments of the present invention, as long as the recipient's email domain is known to the sender's email domain, each recipient's encryption certificate is automatically retrieved from the recipient's email domain by the sender's email domain so that the sender only needs to know the email address of the recipient to successfully communicate an encrypted email message.

Figure 1:
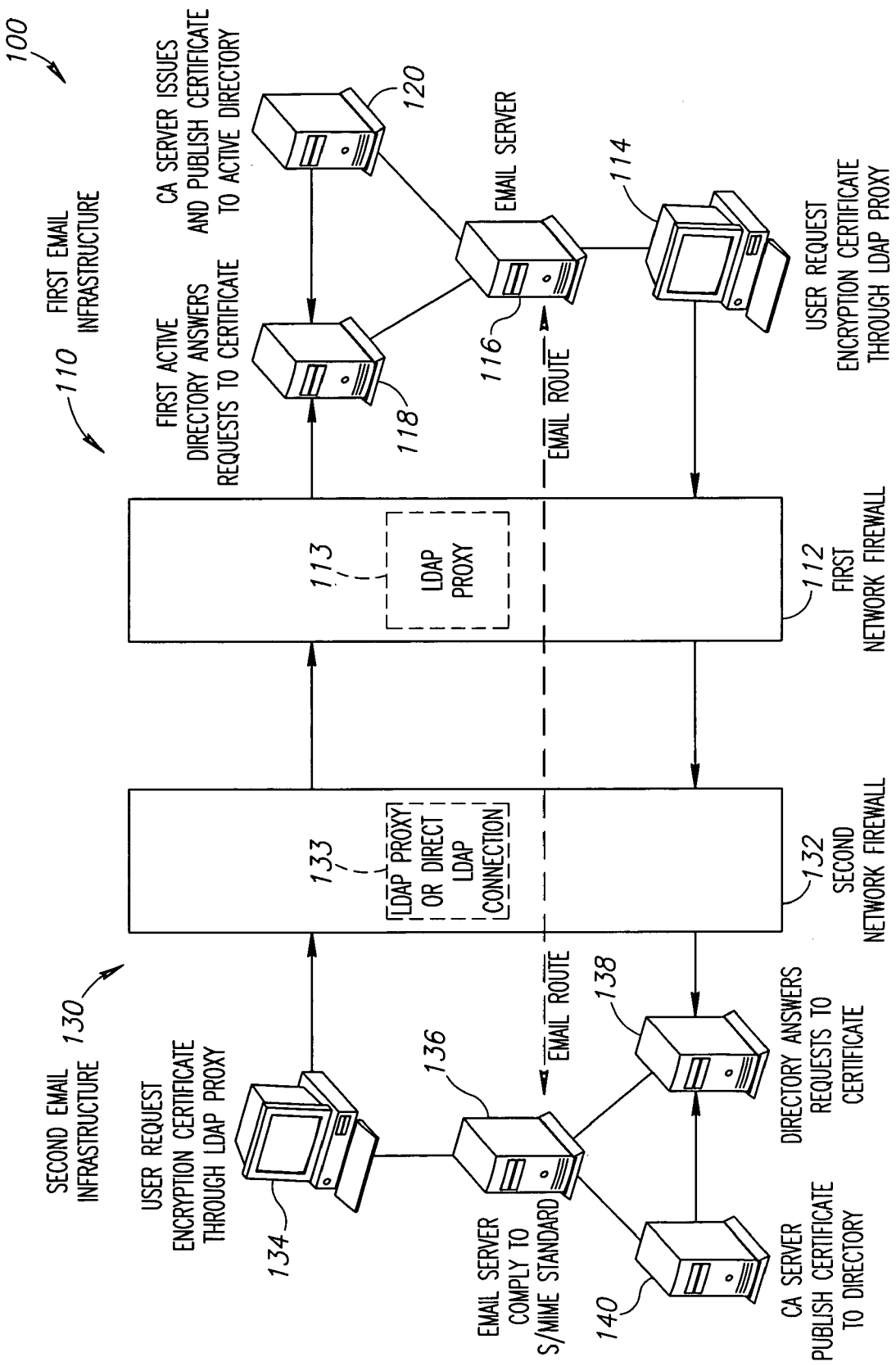
FIG. 1 is a schematic view of an email system in accordance with an embodiment of the invention.

FIG. 1 is a schematic view of an email system 100 in accordance with an embodiment of the invention. In this embodiment, the email system 100 includes a first email infrastructure 110 having a first network firewall 112 operatively coupled to a second network firewall 132 of a second email infrastructure 130. The first network firewall 112 includes a directory access proxy component 113 adapted to enable software utilities, such as an email software utility, to look up information from a server. In one particular embodiment, the directory access proxy component 113 includes a Lightweight Directory Access Protocol (LDAP), however, in alternate embodiments, other directory access protocols may be used.

More specifically, in some embodiments operating under a Public Key Infrastructure (PKI) scheme for exchange of encrypted email, each user has two encryption keys: a public key that allows encryption and a private key which allows decryption. These keys may be contained in the user's public and private (e.g. X.509) user certificates. Another user who has a copy of a user's public certificate can encrypt email that only the certificate's owner can decrypt using their private certificate. The directory access proxy component 113 is designed to facilitate the location and exchange of these public certificates.

With continued reference to FIG. 1, the first email infrastructure 110 further includes a first client (or first computer) 114 coupled to the first network firewall 112 and having a suitable capability for sending and receiving encrypted email messages. In one particular embodiment, for example, the first client 114 is adapted to send and receive encrypted email messages using the Outlook® 2003 software commercially-available from the Microsoft Corporation of Redmond, Wash. Alternately, the first client 114 may use any other software that is compliant with S/MIME (Secure/Multipurpose Internet Mail Extensions) standards. In still other alternate embodiments, the first client 114 may use any other suitable software for sending and receiving encrypted email messages.

As further shown in FIG. 1, in this embodiment, a first email server 116 is coupled to the first client 114. In one particular embodiment, the first email server 116 may use the Microsoft Exchange Server® software commercially-available from the Microsoft Corporation of Redmond, Wash., however, in alternate embodiments, any suitable software may be used. A first active directory 118 is coupled to the first email exchange server 116 and to the first network firewall 112. In one particular embodiment, the first active directory 118 may be constructed using the Windows® software commercially-available from the Microsoft Corporation of Redmond, Wash., however, in alternate embodiments, any suitable software may be used. A first certificate authority (CA) server 120 is coupled to the first active directory 118 and to the first email server 116. The first CA server 120 is adapted to issue and publish certificates to the first active directory 118.

The second email infrastructure 130 may have a structure similar to the first email infrastructure 110. More specifically, as shown in FIG. 1, the second network firewall 132 of the second email infrastructure 130 includes a directory access proxy component 133 (e.g. an LDAP proxy component) or alternately, a direct access connection (e.g. a direct LDAP connection). A second client (or second computer) 134 is coupled to the second network firewall 132 and to a second email server 136. A second active directory 138 is coupled between the second network firewall 132 and the second email server 136, while a second CA server 140 is coupled between the second active directory 138 and the second email server 136.

Figure 2A:
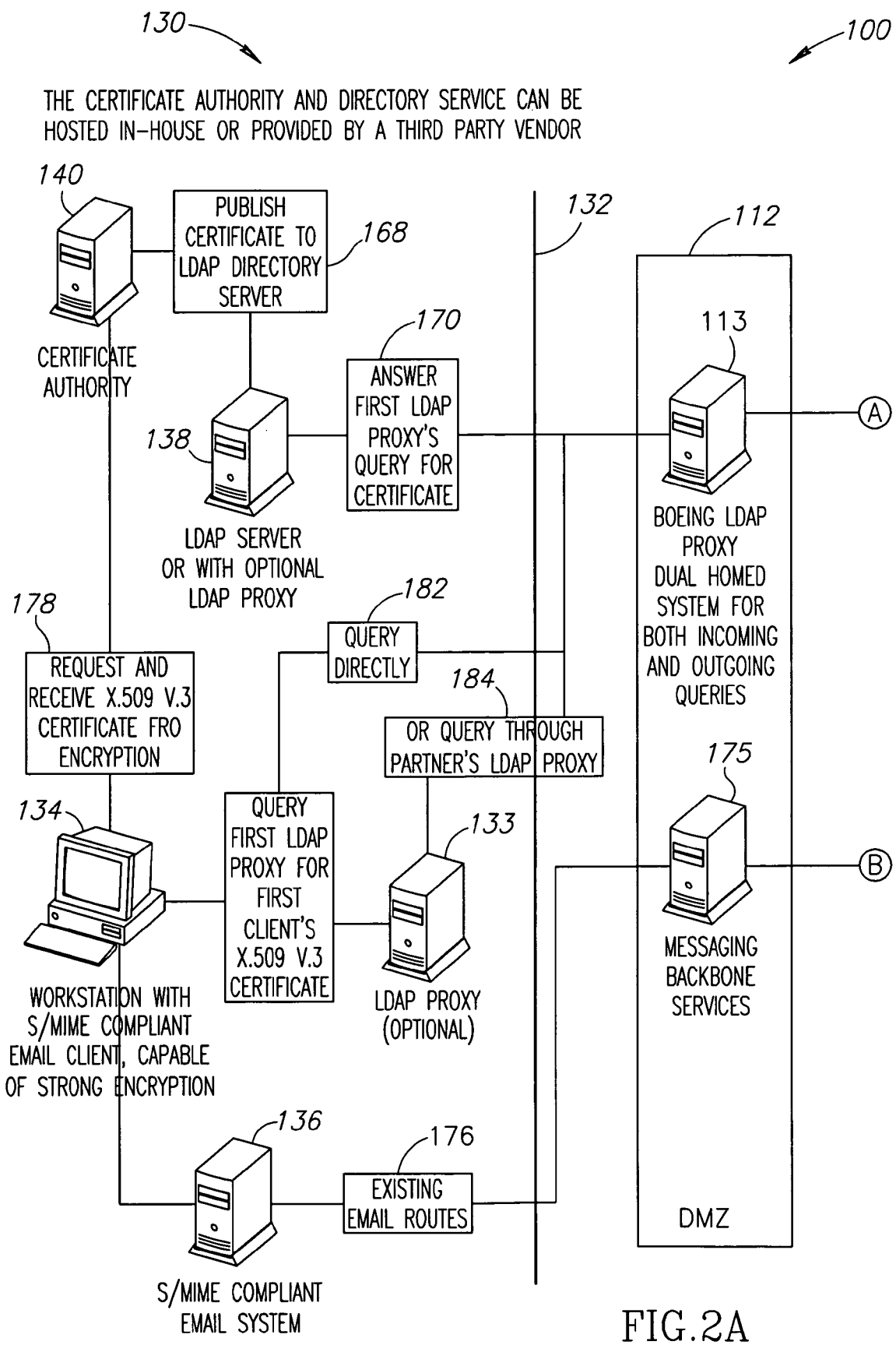
FIG. 2 is a schematic view of a more specific embodiment of the email system of FIG. 1.
Figure 2B:
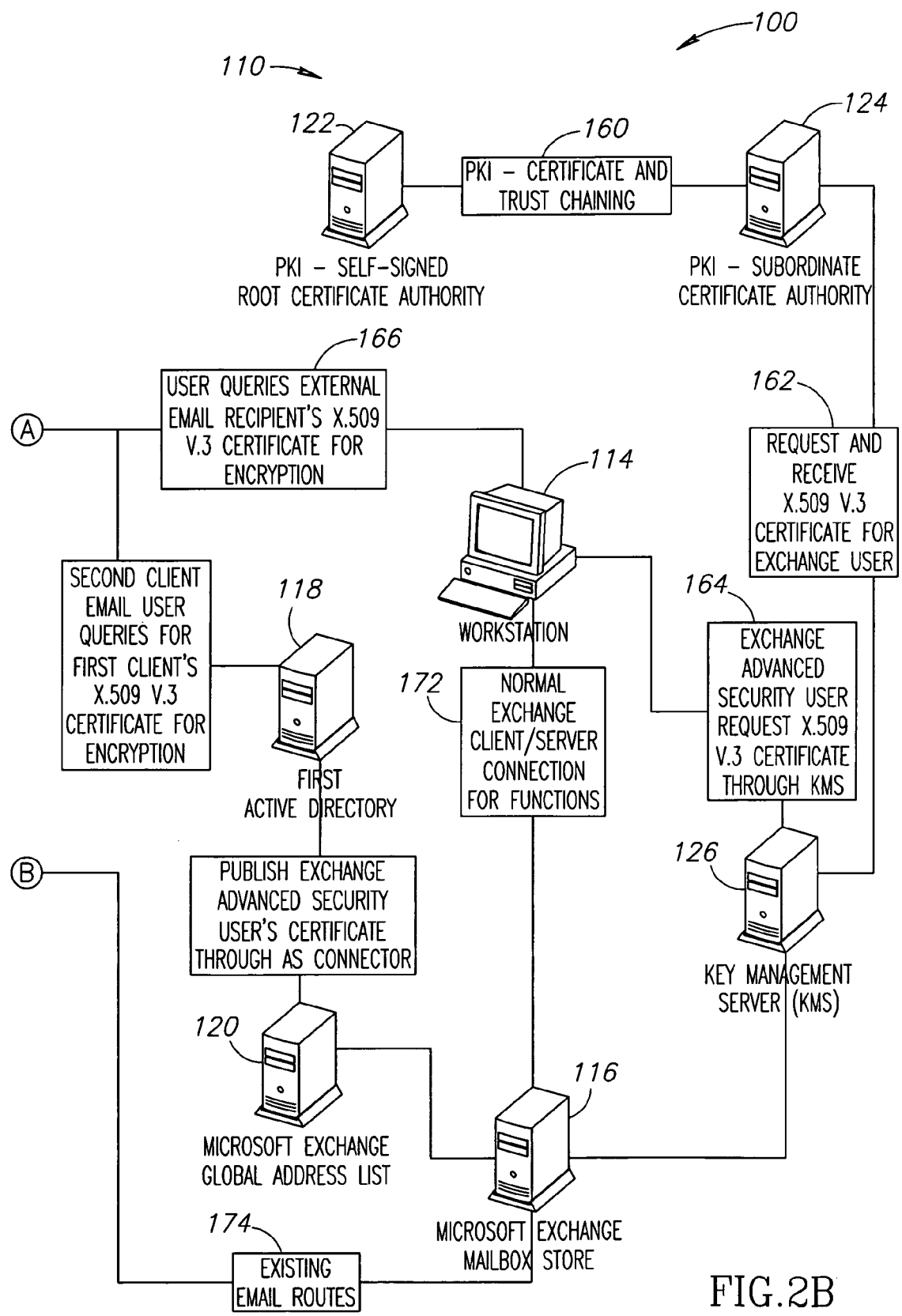

FIG. 2 is a schematic view showing additional details of the structure and operation of the email system 100 of FIG. 1. As shown in FIG. 2, the first email infrastructure 110 may include a Public Key Infrastructure (PKI) root certificate authority 122 coupled to a PKI subordinate certificate authority 124 which, in turn, is coupled to a Key Management Server (KMS) 126. The PKI root certificate authority 122 provides certificates and trust chaining information 160 for one or more users of the first client 114 to the PKI subordinate certificate authority 124. In turn, the PKI subordinate certificate authority 124 may request and receive additional information 162 applicable to the certificate of the one or more users, including, for example, additional information regarding the definition of the user's digital certificate, such as X.509 certification information. The KMS 126 exchanges information with the PKI root and subordinate certificate authorities 122, 124 and, in turn, exchanges advanced security request information 164 with the first client 114 and the first email server 116.

Figure 3A:
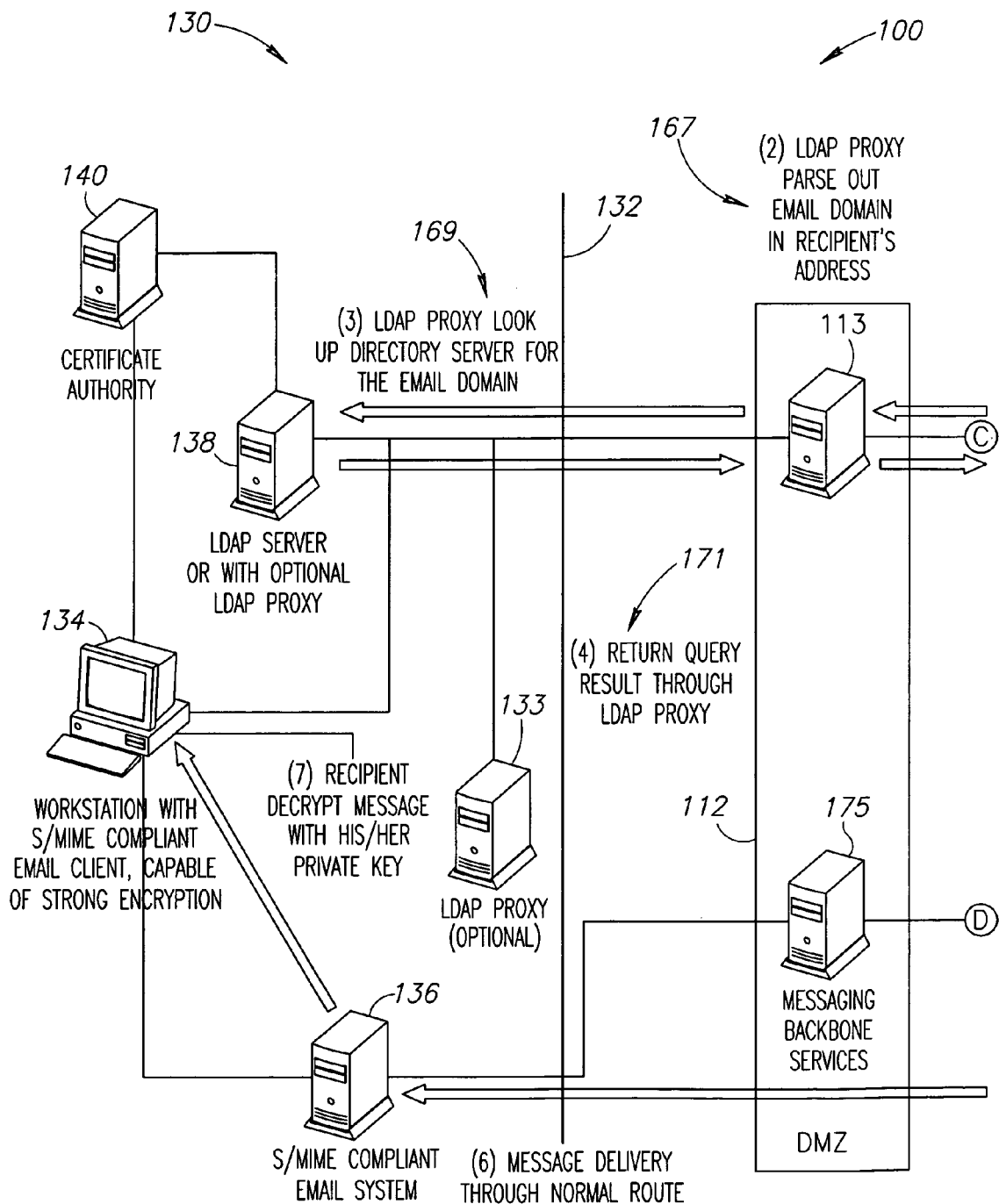
FIG. 3 is a schematic view of the email system of FIG. 2 in an outbound query mode of operation.
Figure 3B:
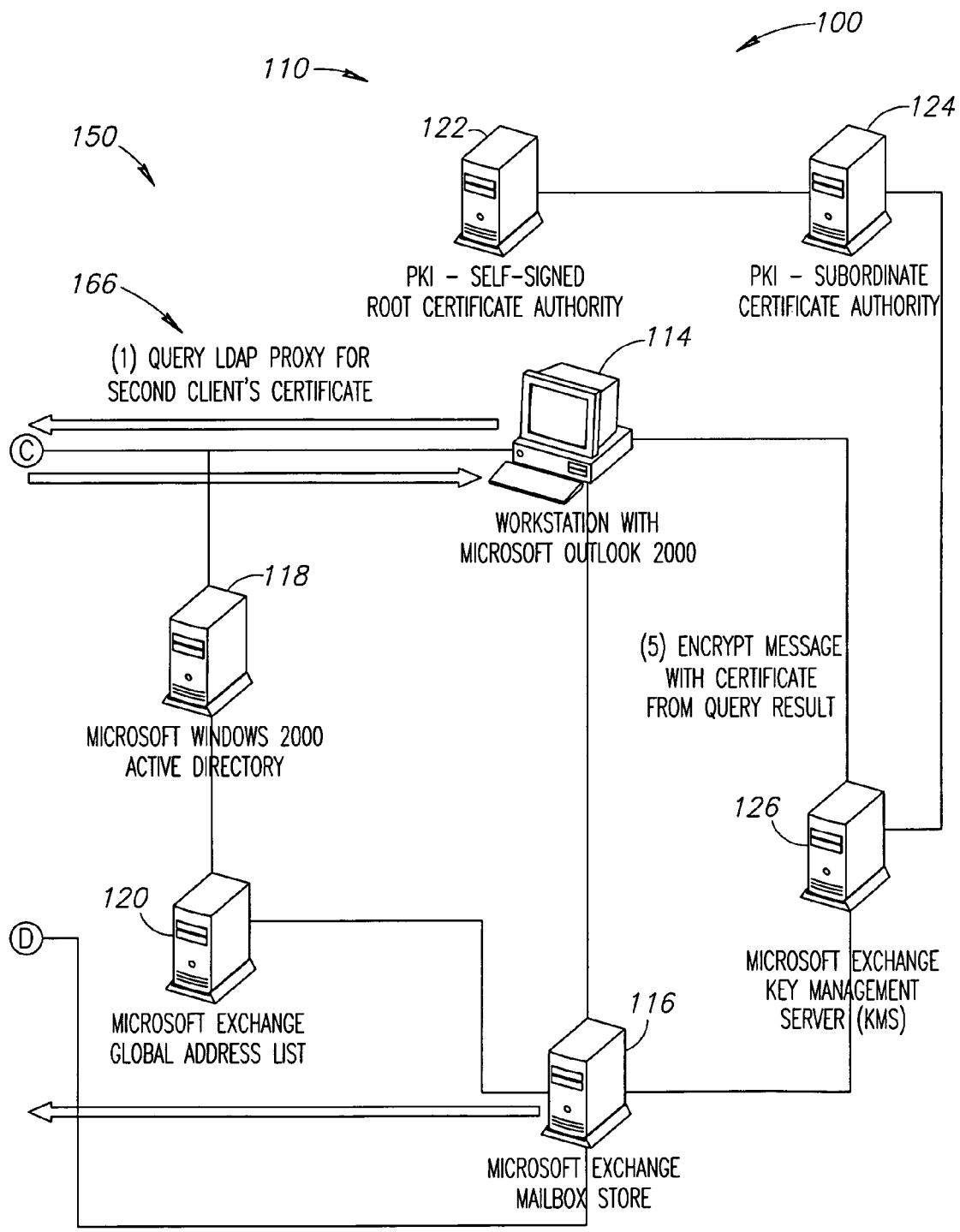

FIG. 3 is a schematic view of the email system 100 of FIG. 2 in a first mode of operation 150. In the first more of operation, the first client 114 desires to transmit a first encrypted email message to the second client 134. The first client 114 creates a first unencrypted email message and provides the email address corresponding to the second client 134. The first client 114 then issues a "send" command to initiate a first sequence of events that results in the encryption of the first unencrypted email message, and the transmittal of the resulting first encrypted email message to the second client 134.

As shown in FIGS. 2 and 3, after the "send" command is issued, the software residing on the first client 114 automatically transmits a first query 166 to the directory access proxy component 113 for a second encryption certificate (or key) of the second client 134. The directory access proxy component 113 may parse out a second email domain 167 (FIG. 3) contained in the email address of the second client 134, and may also look up 169 the second directory server 138 corresponding to the second email domain (FIG. 3). In response to the first query 166, the second CA 140 of the second email infrastructure 130 may publish 168 the second encryption certificate of the second client 134 to the second active directory 138 which, in turn, provides 171 the second encryption certificate requested by the first client 114 to the directory access proxy component 113. The directory access proxy component 113 then provides the second encryption certificate to the first client 114.

Additional capabilities of certain specific embodiments of the directory access proxy component 113 will now be described. For the sake of brevity, these capabilities and alternate embodiments will be described in terms of a directory access proxy component 113 that uses the LDAP protocol, however, it should be appreciated that alternate embodiments of directory access proxy components may be conceived and implemented that use protocols other than LDAP. More specifically, in some embodiments, the directory access (or LDAP) proxy component 113 has at least two major functions: a front end acting as an LDAP server, and a back end acting as a proxy. The front end may use the Open LDAP source code under an open source license, and may include additional code for security filtering functions. The back end proxy may be adapted to look for information based on the sender's query. In a particular embodiment, the LDAP Proxy server resides on the public Internet and maintains a list of certificate servers available on the Internet which contain public X.509 user certificates for employees of the company or organization maintaining that server. A sender wishing to encrypt email to a recipient may use an email client program capable of encryption email to query the LDAP proxy component 113 by sending the email address of the intended recipient to the LDAP proxy component 113. The LDAP proxy component 113 may use the email address (or other suitable recipient identifier) to locate the appropriate certificate server, and may also use the email address as a search key for the recipient. If the recipient's information is found on that server, the recipient's public certificate is downloaded to the LDAP proxy component 113 and returned to the requestor's email client. The email client can then use the encryption key contained in the public certificate to encrypt and send email to the recipient.

In further embodiments, the LDAP proxy component 113 may facilitate the exchange of encrypted email between the first and second email infrastructures 110, 130 through the use of X.509 personal certificates and certificate revocation lists (CRL). The LDAP proxy component 113 may accept an email address (or other recipient identifier) and search remote servers (e.g. LDAP servers) for an X.509 public encryption certificate belonging to the person who matches the email address. Alternately, the LDAP proxy component 113 can be used to find and return a certificate revocation list (CRL) which may be used to confirm that one or more of the public encryption certificates that have just been fetched have not been revoked by the certificate issuer. The use of X.509 certificates and CRLs may advantageously allow disparate email programs, such as Microsoft's Outlook® and Netscape's Communicator®, to exchange encrypted email.

The LDAP proxy component 113 may listen on a standard LDAP port (389) for queries from either inside or outside of the first email infrastructure 110. These queries can be made from any type of client, but will typically come from an address book client or email program. As noted above, the LDAP proxy component 113 may be designed to process two types of LDAP queries: requests for public certificates and requests for certificate revocation lists (CRL). Requests for public certificates must have a search filter containing a valid email address (or other recipient identifier). The email address is used by the LDAP proxy component 113 to search a locally maintained list of servers. These servers may provide employee information for the companies and organizations that own the server. If the LDAP proxy component 113 finds a server in the list that services the requested email address, a query (e.g. an LDAP query) is made to that server using the email address as a search key. If employee information is available for that email address, the LDAP proxy component 113 may collect, for example, the common name of the employee and their public certificate (if available) and returns these items to the original requester. Once the requester's email program has the public certificate, it can send encrypted email to the owner of that certificate.

In some embodiments, requests for CRLs contain at least two pieces of information: the CRL attribute name of "CertificateRevocationList", and a base DN which defines the location of the CRL on the CRL server. An example of a base DN is ou=netscape,ou=certservers,o=Boeing,c=US. This base DN may be compared with base DNs listed in the locally maintained CRL server list. If a match is found, a CRL request is send by the LDAP proxy component 113 to the matched server specifying the base DN as the location of the CRL on that server. The LDAP proxy component 113 may fetch one or more CRLs from the CRL server and return them to the requesting client.

In a particular embodiment, the LDAP proxy component 113 uses a software program that includes at least two components. A first component is an OpenLDAP daemon (hereinafter referred to as a "slapd" daemon) that is used as an LDAP front-end process, and a second component (hereinafter referred to as "getcert") used as back-end process to slapd. The front-end process listens on LDAP port 389 and establishes LDAP sessions with remote LDAP clients. When the front-end receives an LDAP query from the remote client, the LDAP search parameters are handed to the back-end process getcert. Getcert then pulls the email filter from the search criteria and uses it to search the local LDAP server list, query the appropriate remote LDAP servers found in the server list, and return any results back to the front-end process. The slapd front-end then hands the data to the remote LDAP client and terminates the LDAP session.

As further shown in FIG. 3, using a first encryption certificate (or key) provided by the KMS 126 and the second encryption certificate (or key) returned from the second email infrastructure, the first client 114 encrypts 173 the first unencrypted email message (FIG. 3) and transmits the resulting first encrypted email message through normal email routing 173 (FIG. 3). More specifically, in one particular embodiment as shown in FIG. 2, the first encrypted email message is transmitted through a normal email connection 172 (FIG. 2) to the first email server 116, which transmits the first encrypted email message over first existing email routes 174, through a messaging backbone service 175 of the first network firewall 112, through the second network firewall 132 and second existing email routes 176 to the second email server 136, and finally, to the second client 134.

Figure 4A:
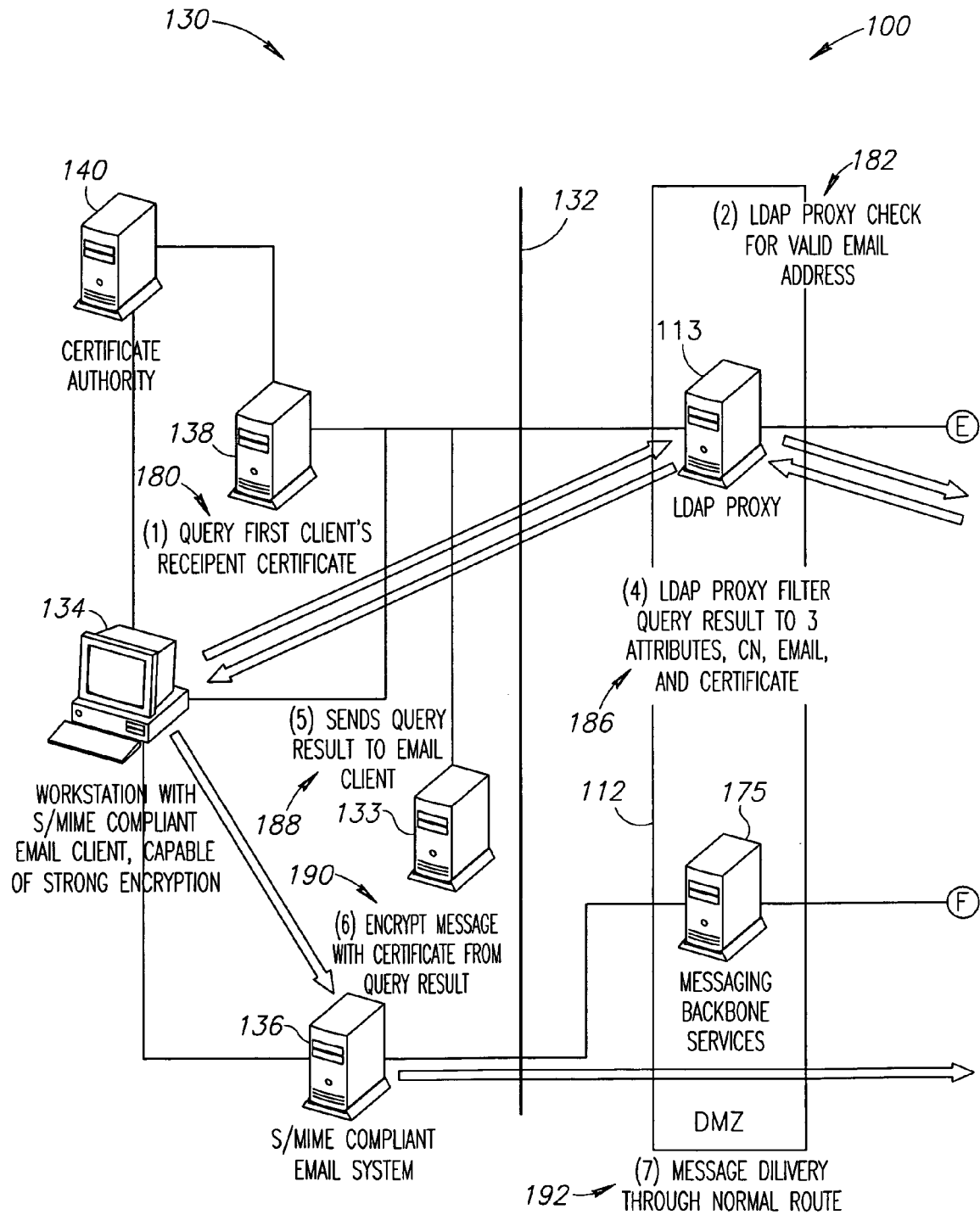
FIG. 4 is a schematic view of the email system of FIG. 2 in an inbound query mode of operation.
Figure 4B:
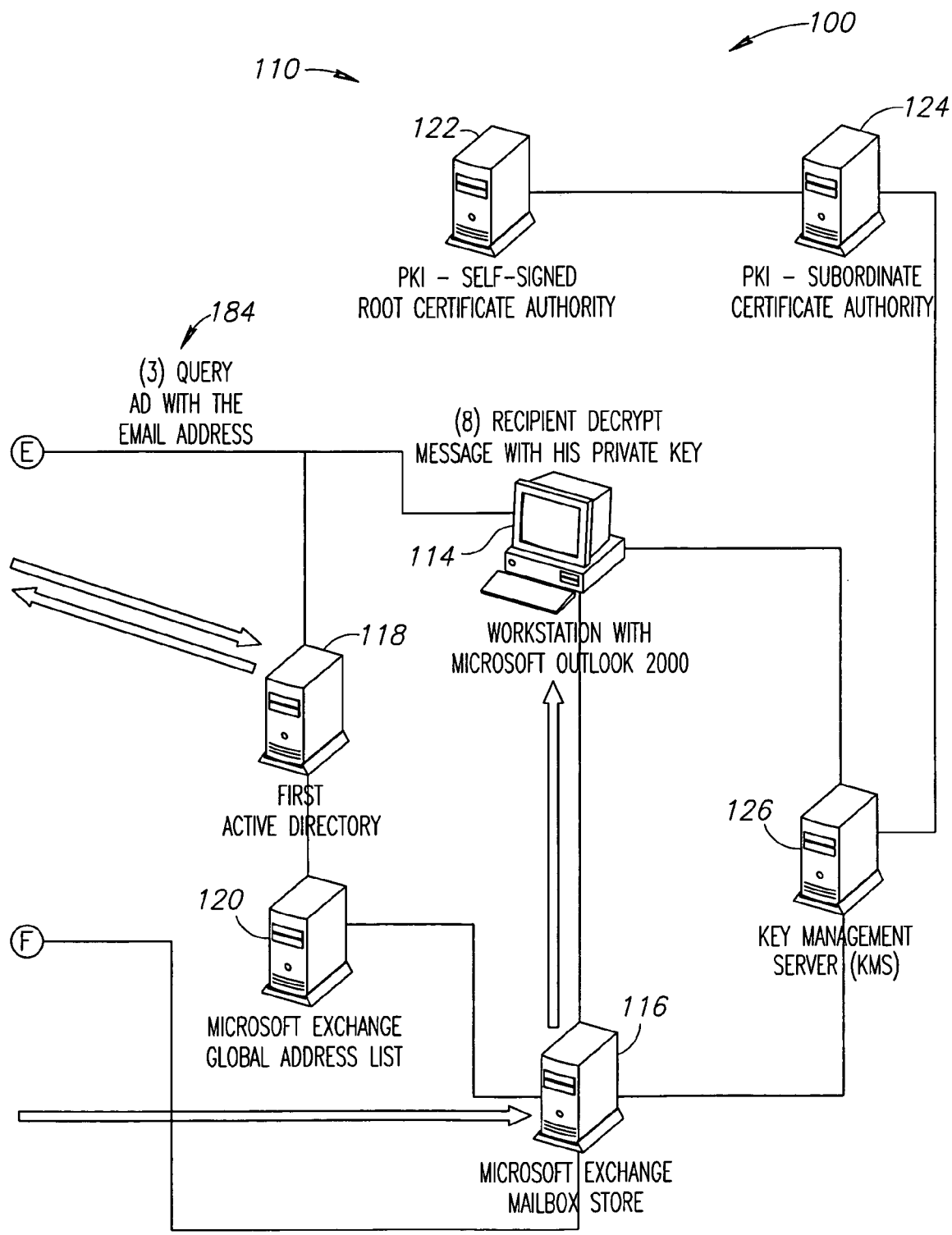

FIG. 4 is a schematic view of the email system 100 of FIG. 2 in a second mode of operation 180. As shown in FIGS. 2 and 4, when the second client 134 desires to transmit a second encrypted email message to the first client 114, the second client 134 creates a second unencrypted email message and provides the email address corresponding to the first client 114. The second client 114 then issues a "send" command to initiate a second sequence of events that results in the encryption of the second unencrypted email message, and the transmittal of the resulting second encrypted email message to the first client 114.

More specifically, after the "send" command is issued, the second client 134 automatically transmits a second query 180 for the first client's recipient encryption certificate (or key). As shown in FIG. 2, the second query 180 may be transmitted directly 182 via the second network firewall 132 to the directory access proxy component 113, or by querying through the second directory access proxy component 133 of the second network firewall 132. The directory access proxy component 113 may check 182 the second query for a valid email address (FIG. 2) that resides within the first email infrastructure 110, and may then query 184 the first active directory 118 using the email address. In response, the first active directory 118, which is updated with current recipient encryption certificate information, provides the requested recipient encryption certificate (or key) to the directory access proxy component 113. The directory access proxy component 113 may the filter 186 the information provided by the first active directory 118, as shown in FIG. 4. For example, in one embodiment, the directory access proxy component 113 filters the return query from the first active directory 118 down to three attributes: a common name (CN), an email address (same as contained within the second query from the second email infrastructure 130, and a public key of the first client 114. Of course, in alternate embodiments, more or less information may be included in the return query 188 from the directory access proxy component 113 to the second client 134. After receiving the return query 188, the second client 134 may automatically encrypt 190 the second unencrypted email message, and may transmit the resulting second encrypted email message along normal email routes 192 to the first client 114 (FIG. 4).

Figure 5:
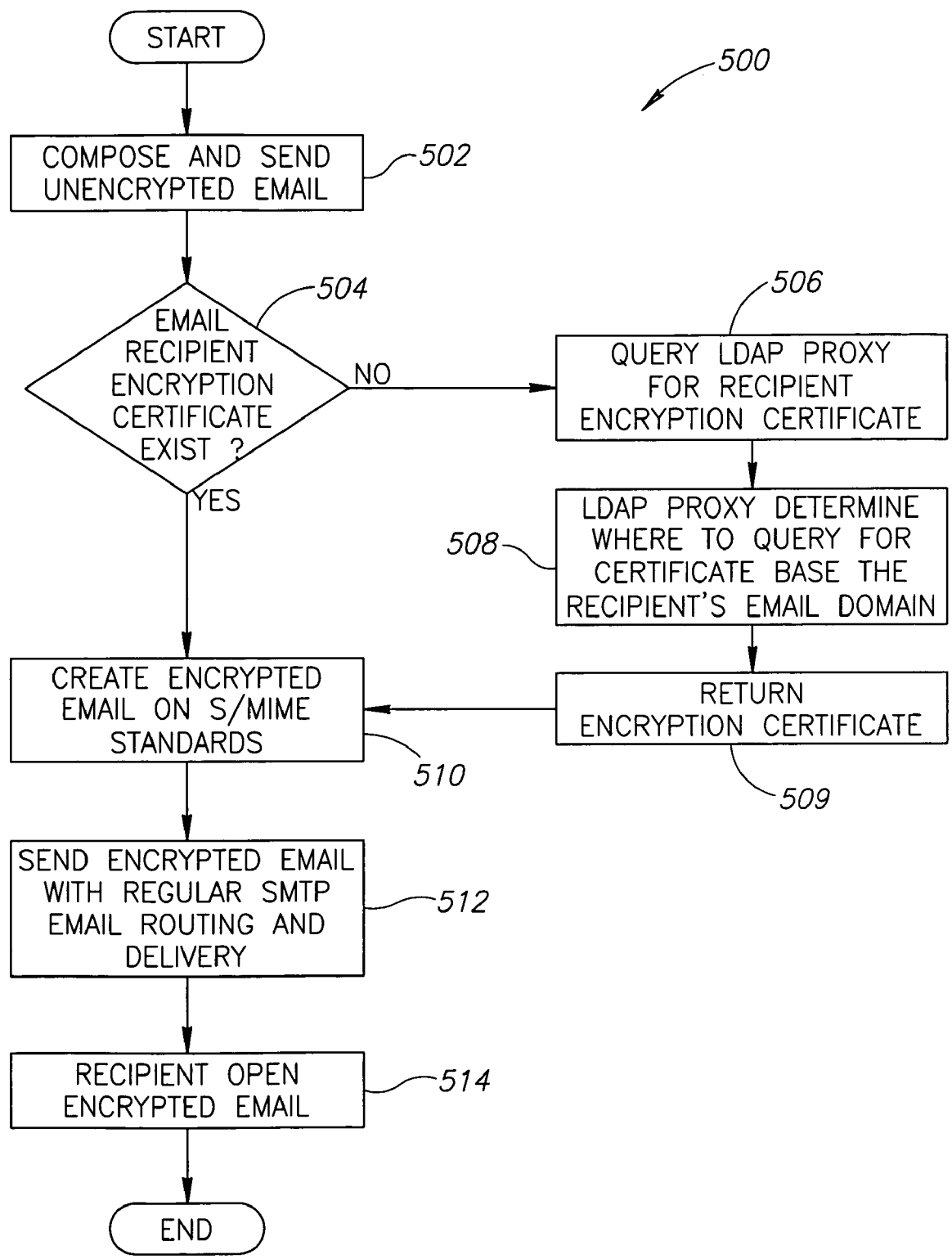
FIG. 5 is a flowchart of a method of transmitting an email message using the email system of FIG. 2 in accordance with another embodiment of the invention.

FIG. 5 is a flowchart of a method 500 of transmitting an email message using the email system 100 of FIGS. 1-4 in accordance with another embodiment of the invention. In this embodiment, with reference to FIGS. 1-5, the method 500 begins with a sender (i.e. either the first or second client 112, 132) composing and sending an unencrypted email message to a recipient (i.e. the other of the first or second clients 112, 132) at a block 502. At a block 504, a determination is automatically made whether the recipient's public encryption certificate (or key) is known to the sender. If the recipient's public encryption certificate is known to the sender, then at a block 510, the unencrypted email message is encrypted. In one particular embodiment, the unencrypted email message is encrypted based on S/MIME standards.

Alternately, as shown in FIG. 5, if the recipient's public encryption certificate is not yet known, then at a block 506, the sender (e.g. the first client 112) automatically queries or requests the recipient's public encryption certificate via the directory access proxy component 113. More specifically, the query may be sent to an LDAP proxy component 113 to obtain the recipient's public encryption certificate. At a block 608, the directory access proxy component 113 queries within the recipient's email domain to obtain the recipient's public encryption certificate, obtains the recipient's public encryption certificate, and at a block 509, returns the recipient's public encryption certificate to the sender.

After the sender's message is encrypted (block 510), the resulting encrypted email message is sent to the recipient at a block 512. In a particular embodiment, the sending of the encrypted email message includes routing and delivery of the encrypted email message using the Simple Mail Transfer Protocol (SMTP). Finally, at a block 514, the recipient opens and reads the encrypted email message.

Figure 6:
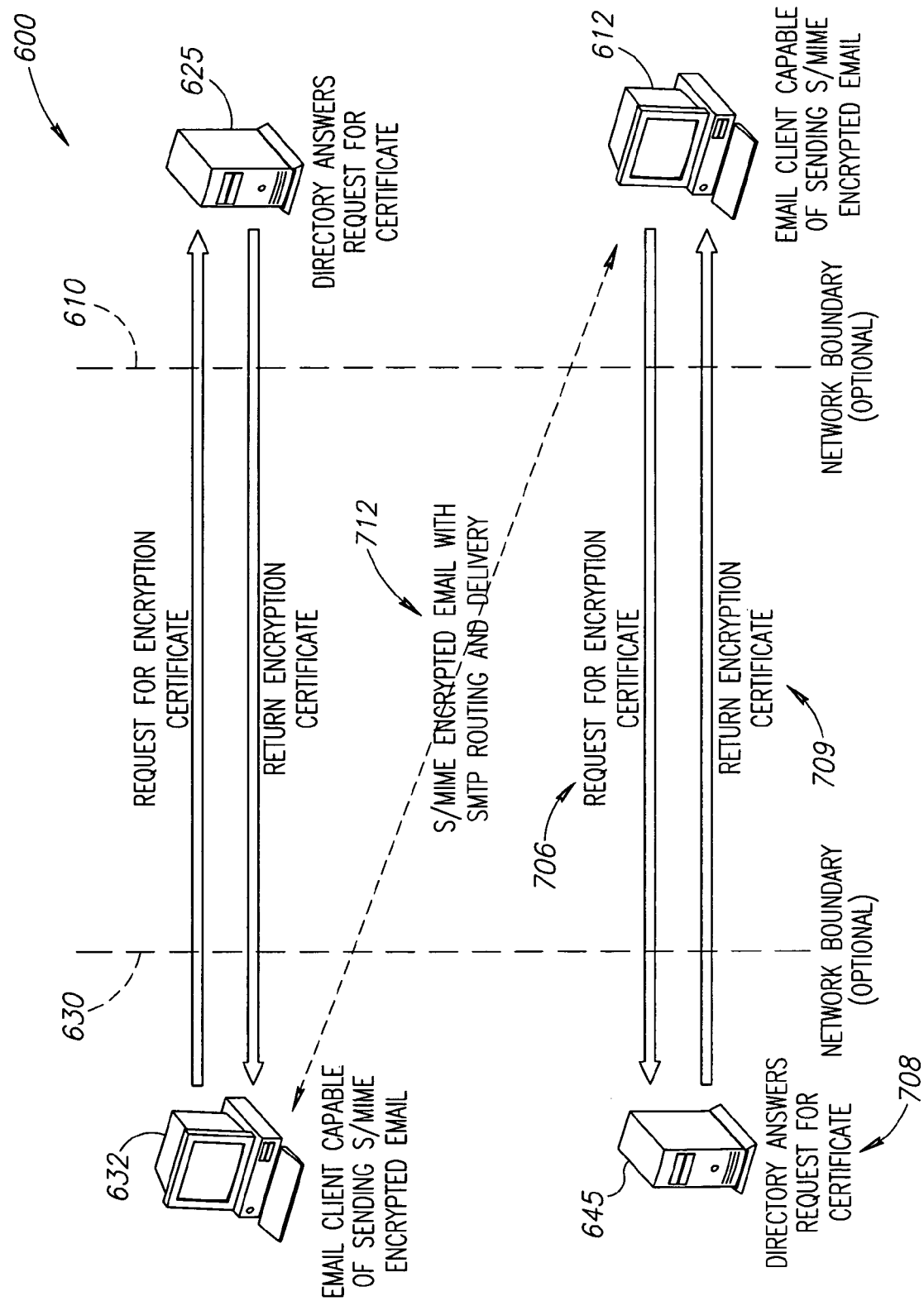
FIG. 6 is a schematic view of an email system in accordance with an alternate embodiment of the invention.

It will be appreciated that a variety of alternate embodiments of systems and methods in accordance with the invention may be conceived, and that the invention is not limited to the particular embodiments described above and shown in the accompanying figures. For example, FIG. 6 is a schematic view of an email system 600 in accordance with an alternate embodiment of the invention. In this embodiment, the email system 600 includes a first client 612 and a second client 632, the first and second clients 612, 632 are adapted to send and receive encrypted email messages. A first network boundary 610 and a second network boundary 630 may be disposed between the first and second clients 612, 632, or alternately, one or both of the first and second network boundaries 610, 630 may be eliminated. A first directory 625 is operatively coupled to the second client 632 and is adapted to provide the first client's public encryption certificate (or key) information to the second client 632, and a second directory 645 is operatively coupled to the first client 612 and is adapted to provide the second client's public encryption certificate (or key) information to the first client 612.

Figure 7:
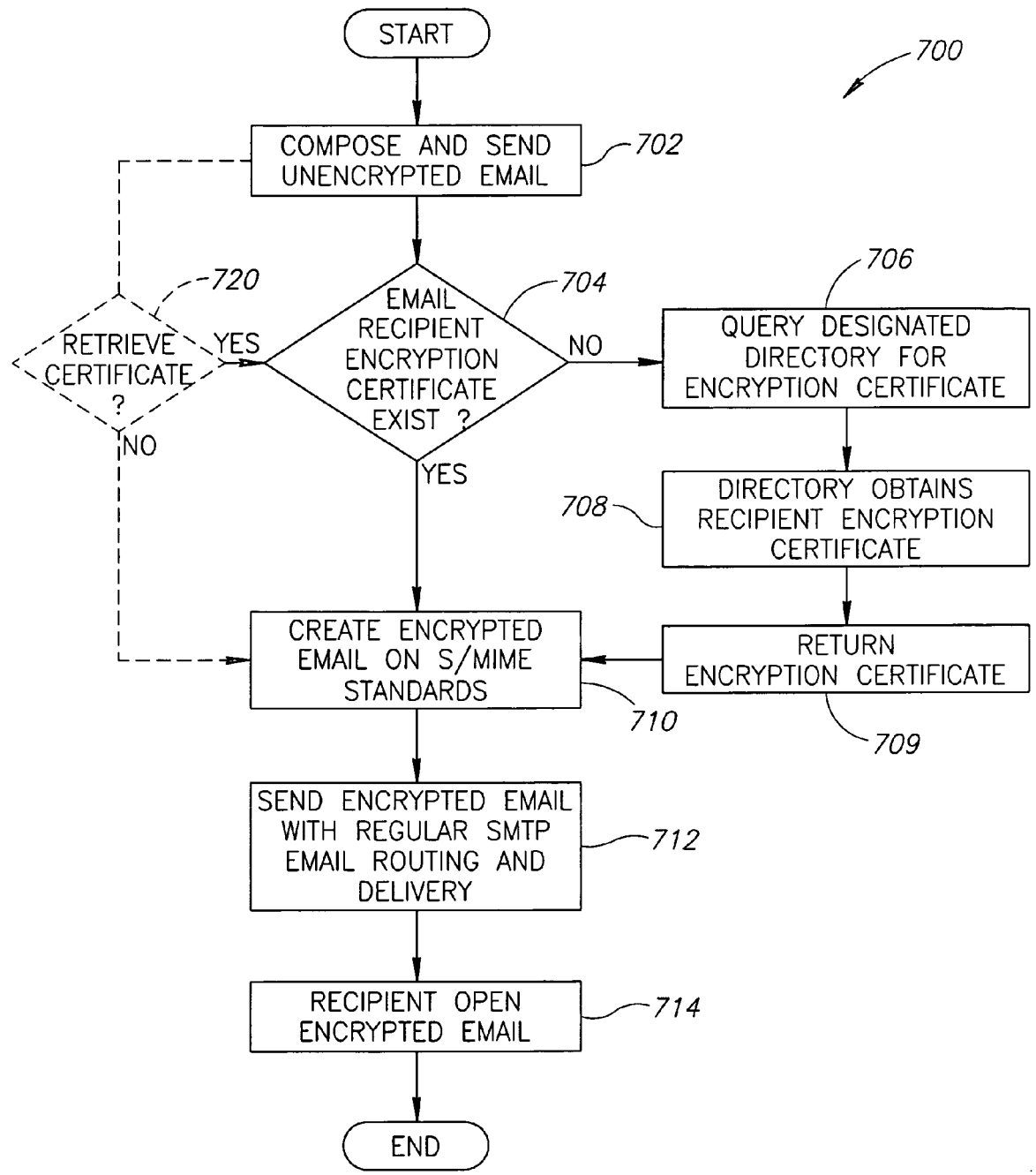
FIG. 7 is a flowchart of a method of transmitting an email message using the email system of FIG. 6 in accordance with another alternate embodiment of the invention.

FIG. 7 is a flowchart of a method 700 of transmitting an email message using the email system 600 of FIG. 6 in accordance with another alternate embodiment of the invention. In this embodiment, the method 700 begins with a sender (i.e. either the first or second client 612, 632) composing and sending an unencrypted email message to a recipient (i.e. the other of the first or second clients 612, 632) at a block 702. At a block 704, a determination is automatically made whether the recipient's public encryption certificate (or key) is known to the sender. If the recipient's public encryption certificate is known to the sender, then at a block 710, the unencrypted email message is encrypted (e.g. encrypted based on S/MIME standards).

However, if the recipient's public encryption certificate is not yet known, then at a block 706, the sender (e.g. the first client 112) automatically queries or requests the recipient's public encryption certificate from a recipient's designated directory (e.g. the second directory 645). At a block 708, the recipient's designated directory obtains the recipient's public encryption certificate, and at a block 709, the recipient's public encryption certificate is provide to the sender to enable the unencrypted email message to be encrypted (block 710). After the sender's message is encrypted at the block 710, the resulting encrypted email message is sent to the recipient at a block 712. Again, in a particular embodiment, the sending of the encrypted email message at block 712 may include routing and delivery of the encrypted email message using the SMTP. Finally, at a block 714, the recipient opens and reads the encrypted email message.

In an alternate embodiment of the method shown in FIG. 7, the preparation of the unencrypted email message (block 702) may occur after the acts associated with retrieval of the recipient's encryption certificate (blocks 704-709). For example, the sender may begin by defining the recipient's common name, email address, or other recipient-identifying information (e.g. email group), at which point the email system 600 may begin performing the acts associated with retrieval of the recipient's encryption certificate (blocks 704-709). The acts associated with retrieval of the recipient's encryption certificate (blocks 704-709) may therefore occur prior to, or simultaneously with, the preparation of the unencrypted email message by the sender. After both the retrieval of the recipient's encryption certificate and the preparation of the unencrypted email message by the sender have occurred, then the encryption of the unencrypted message and the transmittal of the encrypted message may be performed.

In further embodiments of the method shown in FIG. 7, the acts associated with retrieval of the recipient's encryption certificate may be performed semi-automatically or "on command" rather than fully automatically. For example, in a situation where the sender has recently successfully transmitted an encrypted email message to one or more recipients, and has confidence that the email encryption certificates currently known and stored in the sender's email infrastructure are valid, the sender may elect to bypass the acts associated with automatic retrieval of the one or more recipient's encryption certificates. Thus, the email infrastructure may require the sender to affirmatively elect to perform (or to bypass) the acts associated with automatic retrieval of the one or more recipient's encryption certificates. Thus, as shown in FIG. 7, in one alternate embodiment, a method includes a determination by the sender (in this case after block 702 and before blocks 704 and 710) whether to perform the acts associated with automatic retrieval of the one or more recipient's encryption certificates at a block 720. Such alternate embodiments may reduce inefficiencies and costs associated with re-querying and re-obtaining recipient encryption certificates when valid recipient encryption certificates are known.

Figure 8:
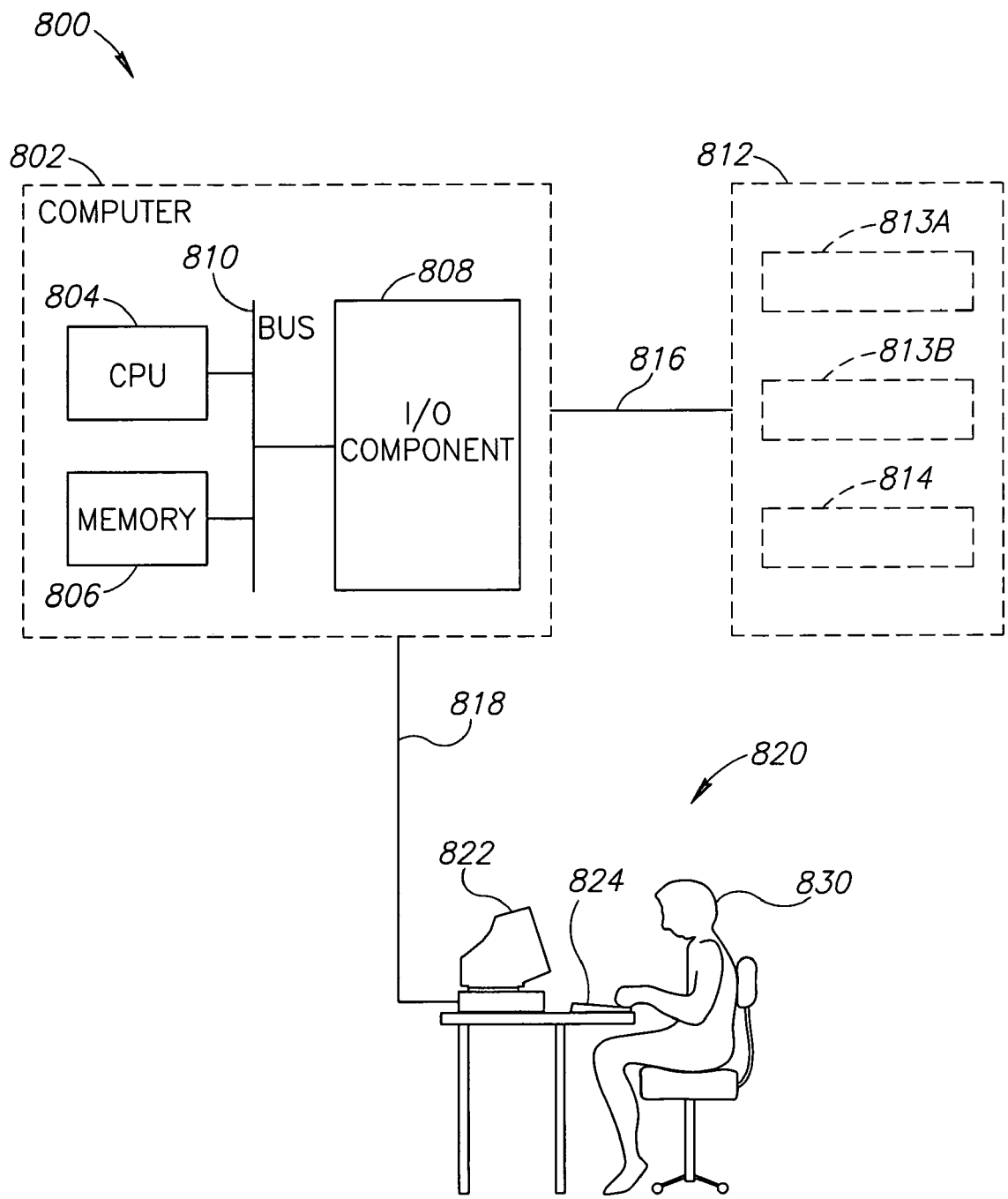
FIG. 8 is a computer system adapted to communicate encrypted email messages in accordance with an embodiment of the present invention.

Embodiments of methods and systems in accordance with the present invention may be implemented using a variety of computing hardware platforms. For example, FIG. 8 is a computer system 800 adapted to communicate encrypted email messages in accordance with an embodiment of the present invention. Unless otherwise specified below, the components of the computer system 800 are of generally-known construction, and will not be described in detail. For the sake of brevity, only significant details and aspects of the computer system 800 will be described.

As shown in FIG. 8, in this embodiment, the computer system 800 includes a computer 802 having a central processing unit (CPU) 804 and a memory component 806. The memory component 806 may include one or more memory modules, such as Random Access Memory (RAM) modules, Read Only Memory (ROM) modules, Dynamic Random Access Memory (DRAM) modules, and any other suitable memory modules. The computer 802 also includes an input/output (I/O) component 808 that may include a variety of known I/O devices, including network connections, video and graphics cards, disk drives or other computer-readable media drives, displays, or any other suitable I/O modules. A data bus 810 operatively couples the CPU 804, memory component 806, and the I/O component 808.

The computer 802 is operatively coupled to other portions of an email infrastructure 812 by a first communication link 816. As described more fully above, the other portions of the email infrastructure 812 may include, for example, one or more servers 813 (e.g. email servers, Key Management Servers, PKI servers, active directory servers, etc.) and a network firewall 814. A second communication link 818 operatively couples the computer 802 to a control component 820 having a monitor 822 and a command input device 824 (e.g. a keyboard, an audio-visual input device, etc.).

In one aspect, a machine-readable medium may be used to store a set of machine-readable instructions (e.g. a computer program or software product) into the computer 802, wherein the machine-readable instructions embody a method of performing encrypted email communications in accordance with the present invention. The machine-readable medium may be any type of medium which can store data that is readable by the computer 802, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the computer system 800, including, for example, the I/O component 808, the memory component 806, and in one or more other portions of the email infrastructure 812. Alternately, the machine-readable instructions may be implemented directly into one or more components of the computer 802, without the assistance of the machine-readable medium.

In operation, the computer system 802 is adapted to perform a method of communicating encrypted email messages in accordance with the invention. For example, an operator 830 may input a recipient identifier and an unencrypted email message through the command input device 824 into the memory component 806. The operator may then transmit a "send" command, causing the CPU 804 to invoke the software product to automatically perform the acts described above without further action or intervention by the operator 830. More specifically, the computer 802 may invoke a set of software instructions stored in the computer 802 (e.g. in the memory component 806) that performs one or more aspects of a method of communicating an encrypted email message in cooperation with the other portions of the email infrastructure 812, including determining a recipient's encryption key, determining a sender's encryption key, encrypting the unencrypted email message, and transmitting the encrypted email message to the recipient identifier. Alternately, one or more aspects of the various processes described above may be implemented in the computer 802 using any suitable programmable or semi-programmable hardware components (e.g. EPROM components).

Embodiments of systems and methods in accordance with the present invention may provide significant advantages over prior art email communication systems. For example, embodiments of the invention enable the automated exchange of encryption certificates or keys without the need for the sender to manually obtain the recipient's encryption certificate. Using embodiments of the present invention, as long as the recipient's email domain is know to the sender's email domain, each recipient's encryption certificate may be automatically retrieved from the recipient's email domain by the sender's email domain so that the sender only needs to know the email address of the recipient to successfully communicate an encrypted email message. Embodiments of the present invention may thereby enable the transmission of encrypted email messages to be performed more efficiently in comparison with prior art methods, particularly within organizations having large numbers of users.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A communication method between a machine running an email client and its email firewall, the method comprising using the machine to:
   generate an email message for a recipient;
   prior to sending the message to the firewall, automatically generate a query and send the query to a directory access proxy component of the firewall, the query requesting the proxy component to obtain a public encryption certificate corresponding to the recipient;
   receive the public encryption certificate from the proxy component;
   use the certificate to encrypt the email message; and
   send the encrypted email message to the firewall.

2. The method of claim 1, wherein the recipient is identified by at least one of a recipient email address, a recipient common name, and a recipient group name.

3. The method of claim 1, wherein when the client issues a "send" command, the machine automatically generates the query and sends the query to the proxy component of the firewall.

4. The method of claim 1, wherein the query is sent to Lightweight Directory Access Protocol (LDAP) proxy component of the firewall.

5. The method of claim 1, wherein the client relies upon the LDAP proxy component as a transport mechanism that automatically looks up a recipient email domain and obtains the public key certificate.

6. The method of claim 1, wherein the email message is sent to additional recipients, and wherein the client relies upon the LDAP proxy component as a transport mechanism that automatically looks up a recipient email domain and obtains a public key certificate for each additional recipient.

7. The method of claim 1, wherein email message is based on at least one Secure/Multipurpose Internet Mail Extensions (S/MIME) standard.

8. The method of claim 1, wherein the encrypted email message is sent using the Simple Mail Transfer Protocol (SMTP).

9. An article comprising computer-readable memory encoded with an email client for causing a computer to communicate with a firewall, including:
    generating an email message for a recipient;
    prior to sending the message to the firewall, automatically generating a query and send the query to a directory access proxy component of the firewall, the query requesting the proxy component to obtain a public encryption certificate;
    receiving public encryption certificate from the proxy component;
    using the certificate to encrypt the email message; and
    sending the encrypted email message to the firewall.

10. The article of claim 9, wherein the recipient is identified by at least one of a recipient email address, a recipient common name, and a recipient group name.

11. The article of claim 9, wherein generating the query, receiving the certificate, and encrypting the email are performed automatically, whereby the encryption of the e-mail message is transparent to a user of the email client.

12. The article of claim 9, wherein when the query is automatically generated and sent to the proxy component of the firewall in response to a user-initiated command to send the email message.

13. The article of claim 9, wherein the e-mail client relies upon the proxy component as a transport mechanism that automatically looks up the recipient's email domain and obtains the public key certificate.

14. The article of claim 13, wherein the email message is sent to additional recipients, and wherein the client relies upon the proxy component as a transport mechanism that automatically looks up a recipient email domain and obtains a public key certificate for each additional recipient.

15. A computer system comprising:
    a machine having a directory access proxy component; and
    a first computer having an email utility that, prior to sending an email message, automatically generates a query and sends the query to the directory access proxy component of the firewall, the query requesting the proxy component to obtain a public encryption certificate for a recipient of the email message;
    wherein the directory access proxy component queries within the recipient's email domain to obtain the recipient's public encryption certificate and, after receiving the certificate, forwards the certificate to the first computer; and
    wherein the first computer uses the certificate to encrypt the email message and sends the encrypted email to the recipient.

16. The computer system of claim 15, wherein generating the query, receiving the certificate, and encrypting the email are performed automatically by the machine, whereby the encryption of the e-mail message is transparent to a user of the email utility.

17. The computer system of claim 15, further comprising at least one certificate server; wherein the proxy component locates the certificate server that stores the recipient's public certificate.

18. The computer system of claim 15, wherein the directory access proxy component functions as a front end LDAP server and a back end proxy that automatically looks up the recipient's email domain and obtains the public key certificate.

* * * * *

UNITED STATES PATENT AND TRADEMARK OFFICE
CERTIFICATE OF CORRECTION

PATENT NO. : 7,664,947 B2  Page 1 of 1
APPLICATION NO. : 11/248500
DATED : February 16, 2010
INVENTOR(S) : Wen Fang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1157 days.

Signed and Sealed this

Seventh Day of December, 2010

David J. Kappos
*Director of the United States Patent and Trademark Office*